US010063672B2

(12) United States Patent
Kuo

(10) Patent No.: US 10,063,672 B2
(45) Date of Patent: Aug. 28, 2018

(54) DEVICE AND METHOD OF HANDLING PARAMETER CONFIGURATIONS

(71) Applicant: ACER INCORPORATED, New Taipei (TW)

(72) Inventor: Ping-Heng Kuo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 150 days.

(21) Appl. No.: 14/860,729

(22) Filed: Sep. 22, 2015

(65) Prior Publication Data

US 2016/0100390 A1 Apr. 7, 2016

Related U.S. Application Data

(60) Provisional application No. 62/058,704, filed on Oct. 2, 2014.

(51) Int. Cl.
*H04W 4/00* (2018.01)
*H04L 29/08* (2006.01)
(Continued)

(52) U.S. Cl.
CPC ......... *H04L 69/323* (2013.01); *H04B 1/7107* (2013.01); *H04L 1/0003* (2013.01);
(Continued)

(58) Field of Classification Search
None
See application file for complete search history.

(56) References Cited

U.S. PATENT DOCUMENTS 8,040,843 B2 10/2011 Furrer
2013/0077578 A1 3/2013 Wang
(Continued)

FOREIGN PATENT DOCUMENTS

CN 101615999 A 12/2009
CN 102104973 A 6/2011
(Continued)

OTHER PUBLICATIONS

ZTE, Discussion on Higher-layer signalling for NAICS, 3GPP TSG RAN WG1 Meeting #76bis, Mar. 31-Apr. 4, 2014, pp. 1-4, R1-141409, XP050787079, Shenzhen, China.
(Continued)

*Primary Examiner* — Bob A Phunkulh
(74) *Attorney, Agent, or Firm* — Winston Hsu

(57) ABSTRACT

A network for handling parameter configurations comprises a processing means to execute instructions. The instructions comprise determining a subset of parameter configurations; transmitting information of the subset of parameter configurations to a communication device via a higher layer signaling; selecting at least one parameter configuration from the subset of parameter configurations, wherein the at least one parameter configuration corresponds to at least one communication device, respectively; transmitting information of the at least one parameter configuration to the communication device via a physical layer signaling; transmitting a signal to the communication device via a resource according to a transmission scheme and a parameter configuration of the communication device; and transmitting at least one signal to the at least one communication device via the resource according to the transmission scheme and the at least one parameter configuration.

32 Claims, 10 Drawing Sheets

(51) Int. Cl.
*H04L 1/00* (2006.01)
*H04B 1/7107* (2011.01)
*H04W 28/18* (2009.01)
*H04B 7/06* (2006.01)

(52) U.S. Cl.
CPC .......... *H04L 1/0009* (2013.01); *H04L 1/0025* (2013.01); *H04W 28/18* (2013.01); *H04B 7/0634* (2013.01)

(56) References Cited

U.S. PATENT DOCUMENTS

| | | | |
|---|---|---|---|
| 2013/0155990 A1* | 6/2013 | Nishio | H04L 5/0053 370/329 |
| 2014/0153499 A1 | 6/2014 | Wang | |
| 2015/0195074 A1* | 7/2015 | Eriksson | H04L 1/0022 370/252 |
| 2015/0208428 A1* | 7/2015 | Park | H04L 1/1887 370/329 |
| 2015/0245326 A1* | 8/2015 | Rune | H04L 1/0003 370/329 |
| 2015/0358064 A1* | 12/2015 | Benjebbour | H04B 7/0452 370/329 |
| 2016/0029350 A1* | 1/2016 | Kishiyama | H04W 16/28 370/329 |
| 2016/0037460 A1* | 2/2016 | Benjebbour | H04L 1/0003 370/329 |
| 2016/0285535 A1* | 9/2016 | Kim | H04L 5/0016 |

FOREIGN PATENT DOCUMENTS

| | | |
|---|---|---|
| CN | 102368871 A | 3/2012 |
| EP | 1 346 596 B1 | 1/2010 |
| WO | 2013/048303 A2 | 4/2013 |

OTHER PUBLICATIONS

LG Electronics, Discussion on multiuser superposition schemes and signaling schemes, 3GPP TSG RAN WG1 Meeting #82, Aug. 24-28, 2015, pp. 1-4, R1-154282, XP051001613, Beijing, China.
ITL, High Level Signalling of NOMA for Multisuer Superposition Transmission, 3GPP TSG RAN WG1 Meeting #82, Aug. 24-28, 2015, pp. 1-3, R1-154547, XP051001817, Beijing, China.
SEQUANS Communications, on Signaling Alternatives for MUST, 3GPP TSG RAN WG1 Meeting #82, Aug. 24-28, 2015, R1-154023, XP051039388, Beijing, China.
QUALCOMM Europe, Control Channel Issues for DL MIMO, 3GPP TSG-RAN WG1 #44, R1-060455, XP050101395, Feb. 13-17, 2006, pp. 1-5, Denver, USA.

* cited by examiner

DEVICE AND METHOD OF HANDLING PARAMETER CONFIGURATIONS

CROSS REFERENCE TO RELATED APPLICATIONS

This application claims both the benefit of U.S. Provisional Application No. 62/058,704, filed on Oct. 2, 2014 and incorporated herein by reference.

BACKGROUND OF THE INVENTION

1. Field of the Invention

The present invention is related to a communication device and a method used in a wireless communication system, and more particularly, to a communication device and a method of handling parameter configurations in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

An eNB may simultaneously communicate with multiple UEs (e.g., co-scheduled UEs) via the same resource to improve throughput of the system. However, interference may occur to communications between the eNB and the UEs, when the UEs share the same resource. Thus, the eNB may schedule the UEs to use various parameter configurations, to mitigate the effect of the interference. However, the number of the parameter configurations may be large, and this causes large overhead for transmitting information of the parameter configurations. The benefit of the resource sharing (e.g., multi-user MIMO (MU-MIMO)) is reduced due to the overhead.

Hence, how to conveying information of the parameter configurations efficiently is an important topic to be discussed.

SUMMARY OF THE INVENTION

The present invention therefore provides a communication device and a method for handling parameter configurations to solve the abovementioned problem.

A network for handling parameter configurations comprises a storage unit for storing instructions and a processing means coupled to the storage unit. The instructions comprise determining a subset of parameter configurations; transmitting information of the subset of parameter configurations to a communication device via a higher layer signaling; selecting at least one parameter configuration from the subset of parameter configurations, wherein the at least one parameter configuration corresponds to at least one communication device, respectively; transmitting information of the at least one parameter configuration to the communication device via a physical layer signaling; transmitting a signal to the communication device via a resource according to a transmission scheme and a parameter configuration of the communication device; and transmitting at least one signal to the at least one communication device via the resource according to the transmission scheme and the at least one parameter configuration. The processing means is configured to execute the instructions stored in the storage unit.

A communication device for handling parameter configurations comprises a storage unit for storing instructions and a processing means, coupled with the storage unit. The instructions comprise receiving information of a subset of parameter configurations transmitted by a network via a higher layer signaling; receiving information for selecting at least one parameter configuration from the subset of parameter configurations transmitted by the network via a physical layer signaling; and receiving a signal transmitted by the network via a resource according to a transmission scheme, a parameter configuration of the communication device and the at least one parameter configuration. The processing means is configured to execute the instructions in the storage unit.

A network for handling parameter configurations comprises a storage unit for storing instructions and a processing means coupled to the storage unit. The instructions comprise determining a subset of parameter configuration sets; transmitting information of the subset of parameter configuration sets to a communication device via a higher layer signaling; selecting at least one parameter configuration set from the subset of parameter configuration sets, wherein at least one parameter configuration of the at least one parameter configuration set corresponds to at least one communication device, respectively; transmitting information of the at least one parameter configuration set to the communication device via a physical layer signaling; transmitting a signal to the communication device via a resource according to a transmission scheme and a parameter configuration of the communication device; and transmitting at least one signal to the at least one communication device via the resource according to the transmission scheme and the at least one parameter configuration. The processing means is configured to execute the instructions stored in the storage unit.

A communication device for handling parameter configurations comprises a storage unit for storing instructions and a processing means coupled to the storage unit. The instructions comprise receiving information of a subset of parameter configuration sets transmitted by a network via a higher layer signaling; receiving information for selecting at least one parameter configuration set from the subset of parameter configuration sets transmitted by the network via a physical layer signaling; and receiving a signal transmitted by the network via a resource according to a transmission scheme, a parameter configuration of the communication device and the at least one parameter configuration set. The processing means is configured to execute the instructions stored in the storage unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
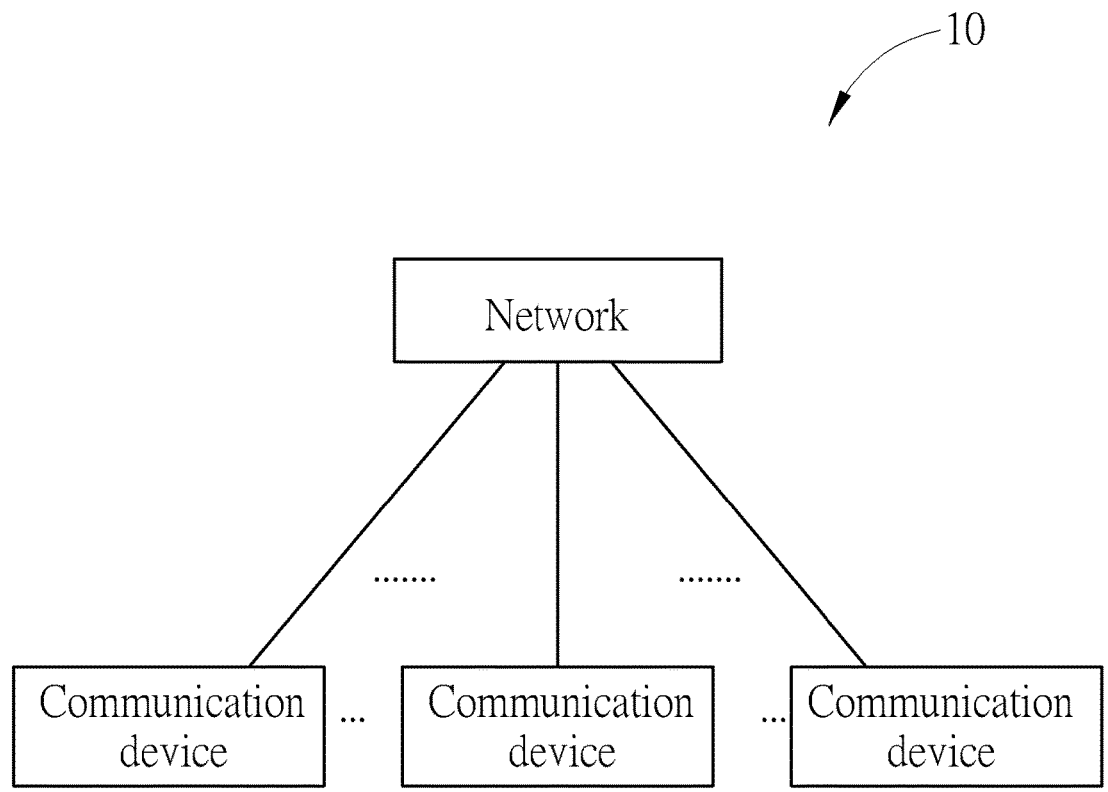
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising at least one Node-B (NB) in a universal mobile telecommunications system (UMTS). In another example, the network can be an evolved UTRAN (E-UTRAN) comprising at least one evolved NB (eNB) and/or relay in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A communication device can be a user equipment (UE), a low cost device (e.g., machine type communication (MTC) device), a device-to-device (D2D) device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
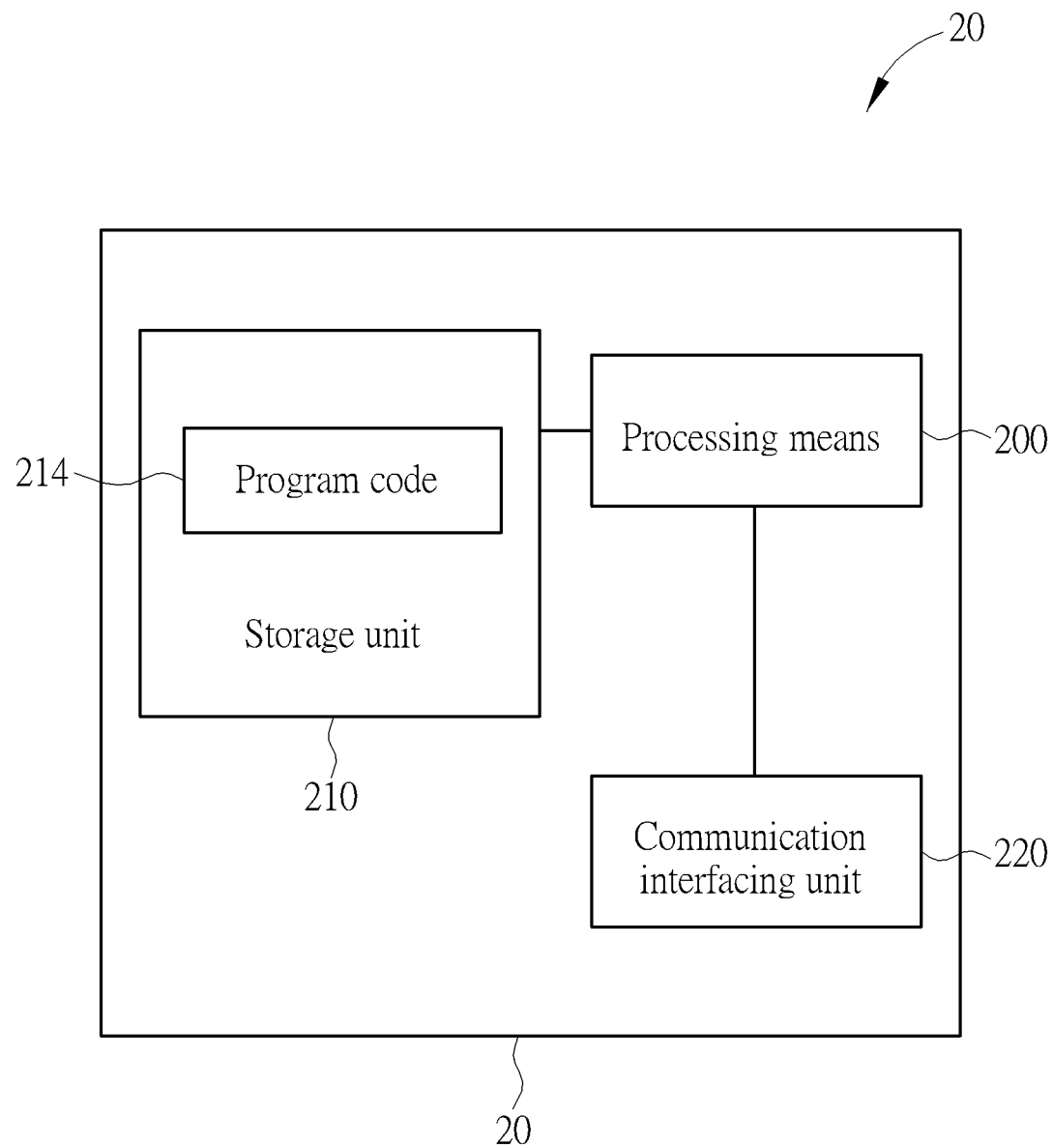
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
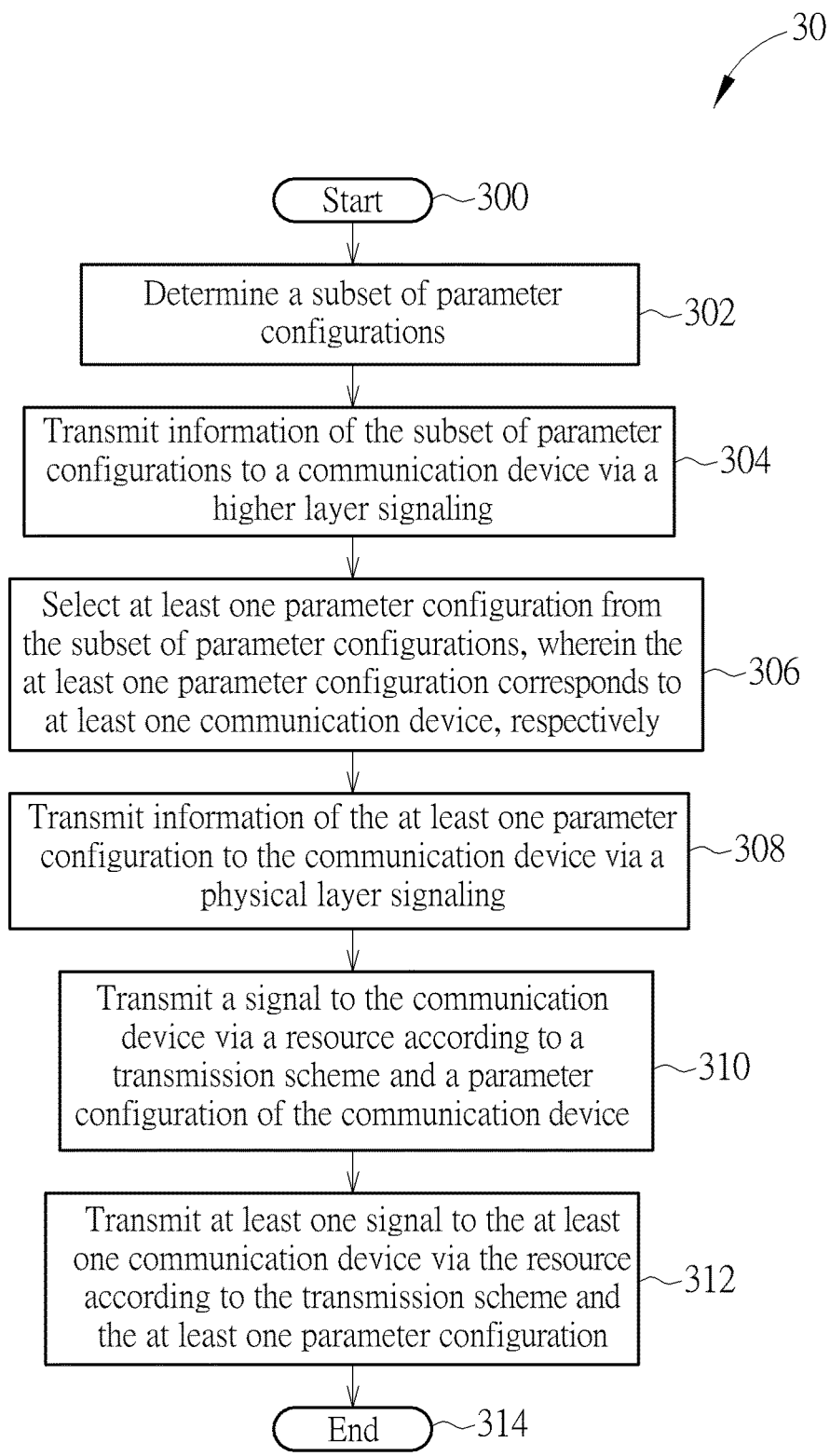
FIG. 3 is a flowchart of a process according to an example of the present invention.
Figure 4:
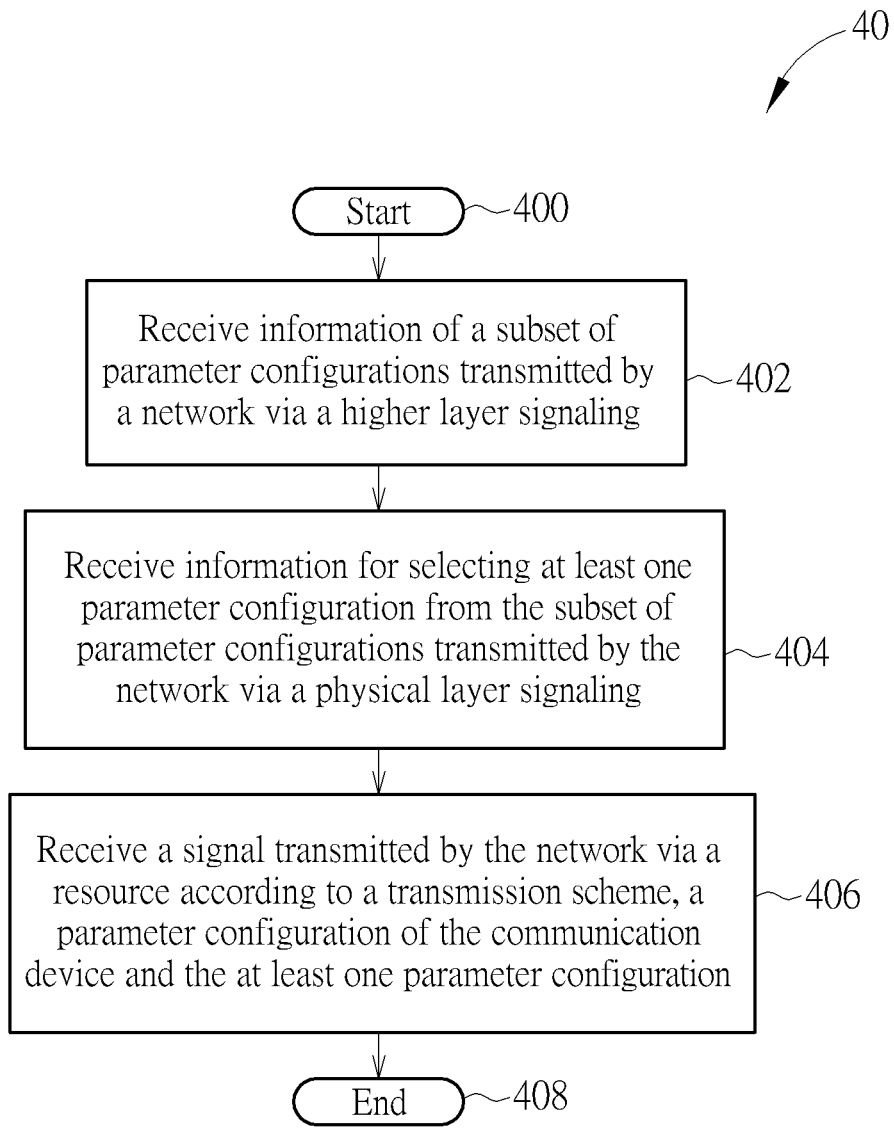
FIG. 4 is a flowchart of a process according to an example of the present invention.

FIG. 3 is a flowchart of a process 30 according to an example of the present invention. The process 30 may be utilized in a network (e.g., network in FIG. 1) to handle parameter configurations. The process 30 may be compiled into the program code 214 and includes the following steps:

Step 300: Start.

Step 302: Determine a subset of parameter configurations.

Step 304: Transmit information of the subset of parameter configurations to a communication device via a higher layer signaling.

Step 306: Select at least one parameter configuration from the subset of parameter configurations, wherein the at least one parameter configuration corresponds to at least one communication device, respectively.

Step 308: Transmit information of the at least one parameter configuration to the communication device via a physical layer signaling.

Step 310: Transmit a signal to the communication device via a resource according to a transmission scheme and a parameter configuration of the communication device.

Step 312: Transmit at least one signal to the at least one communication device via the resource according to the transmission scheme and the at least one parameter configuration.

Step 314: End.

According to the process 30, the network may determine a subset of parameter configurations and may transmit information of the subset of parameter configurations to a communication device via a higher layer signaling (e.g., radio resource control (RRC) signaling). Next, the network may select at least one parameter configuration from the subset of parameter configurations, wherein the at least one parameter configuration corresponds to at least one communication device, respectively. The network may transmit information of the at least one parameter configuration to the communication device via a physical layer signaling (e.g., physical DL control channel (PDCCH) signaling). The network may transmit a signal to the communication device via a resource according to a transmission scheme and a parameter configuration of the communication device. The network may transmit at least one signal to the at least one communication device via the resource according to the transmission scheme and the at least one parameter configuration. That is, the information of the subset of parameter configurations is transmitted less frequently to reduce overhead. The overhead for selecting (and notifying) the at least one parameter configuration for the other communication device(s) is further reduced, because the selection is performed within the subset (e.g., reduced set) of parameter configurations by using the physical layer signaling which is transmitted more frequently. Thus, overhead for notifying the parameter configurations to the communication device can be reduced. Please note that, the resource may be determined according to a resource scheduling of the network. That is, the resource may not be determined by the transmission scheme.

Operations of a communication device in the above examples can be summarized into a process 40 to handle parameter configurations, and can be compiled into the program code 214. The process 40 includes the following steps:

Step 400: Start.

Step 402: Receive information of a subset of parameter configurations transmitted by a network via a higher layer signaling.

Step 404: Receive information for selecting at least one parameter configuration from the subset of parameter configurations transmitted by the network via a physical layer signaling.

Step 406: Receive a signal transmitted by the network via a resource according to a transmission scheme, a parameter configuration of the communication device and the at least one parameter configuration.

Step 408: End.

According to the process 40, the communication device may receive information of a subset of parameter configurations transmitted by a network via a higher layer signaling (e.g., RRC signaling). Next, the communication device may receive information for selecting at least one parameter configuration from the subset of parameter configurations transmitted by the network via a physical layer signaling (e.g., PDCCH signaling). The communication device may receive a signal transmitted by the network via a resource according to a transmission scheme, a parameter configuration of the communication device and the at least one parameter configuration. That is, the information of the subset of parameter configurations is received less frequently to reduce overhead. The overhead for selecting (and receiving) the at least one parameter configuration is further reduced, because the selection is performed within the subset (e.g., reduced set) of parameter configurations by using the physical layer signaling which is transmitted more frequently. Thus, overhead for receiving the information of the parameter configurations from the network can be reduced. Please note that, the resource may be determined according to a resource scheduling of the network. That is, the resource may not be determined by the transmission scheme.

Realization of the present invention is not limited to the above description. The following examples may be applied to the process 30 and/or 40.

In one example, each of the subset of parameter configurations in the process 30 and/or 40 may include a modulation and coding scheme (MCS) and/or a precoding matrix index (PMI). In one example, the transmission scheme may include a non-orthogonal multiple access (NOMA) scheme, a multi-user superposition transmission (MUST) scheme or a multi-user multi-input multi-output (MU-MIMO) scheme. That is, the transmission/reception may be performed according to the NOMA scheme, the MUST scheme or the MU-MIMO scheme. The information of the at least one parameter configuration may be indicated in various ways. For example, the information of the at least one parameter configuration may be represented by at least one bit or a bitmap. Further, a length of the bitmap may be determined according to a size of the subset of parameter configurations. In one example, the resource may include a time resource and/or a frequency resource.

In one example, the communication device in the process 40 may perform a signal processing operation (e.g., interference cancellation, maximum-likelihood (ML) detection, reduced-complexity ML detection or sphere decoding) on the signal according to the transmission scheme and the at least one parameter configuration to obtain a processed signal, after the communication device receives the signal transmitted by the network via the resource. The ML detection, the reduced-complexity ML detection and the sphere decoding may focus on processing the interference cancellation. Next, the communication device may detect (e.g., demodulate and/or decode) the processed signal according to the transmission scheme and the parameter configuration of the communication device. In addition, the interference cancellation may include a successive interference cancellation, a symbol-level interference cancellation, or a codeword-level interference cancellation. Further, the at least one parameter configuration corresponds to at least one communication device, respectively. That is, the network may transmit the at least one signal to the at least one communication device according to the at least one parameter configuration, respectively. The at least one communication device may receive at least one signal transmitted by the network via the resource according to the transmission scheme and the at least one parameter configuration. That is, the network may communicate with the communication device and the at least one communication device via the same resource.

Figure 5:
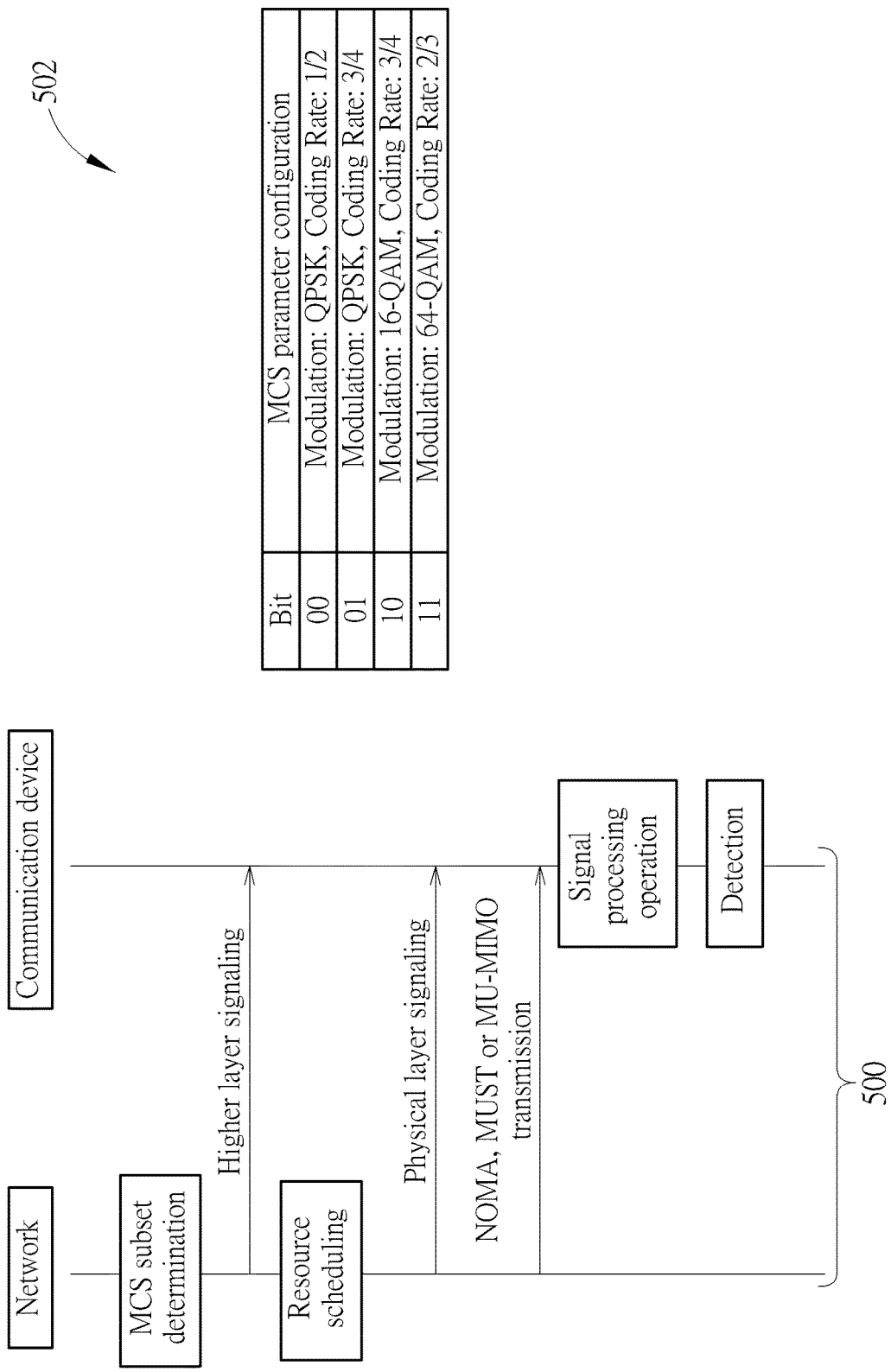
FIG. 5 is a schematic diagram of the selection of MCS parameter configuration according to an example of the present invention.

FIG. 5 is a schematic diagram of the selection of MCS parameter configuration according to an example of the present invention. The interactions between the network (e.g., network in FIG. 1) and the communication device (e.g., communication device in FIG. 1) according to MCS parameter configurations and a transmission scheme (e.g., NOMA scheme, MUST scheme or MU-MIMO scheme) are shown in a region 500. A subset of MCS parameter configurations (e.g., subset of parameter configurations in the processes 30 and/or 40) is shown in a table 502. Information of each of the MCS parameter configurations may be represented by 2 bits.

In the region 500, a subset of MCS parameter configurations may be first determined by the network. For example, the subset of MCS parameter configurations may include four MCS parameter configurations as shown in the table 502. Each of the four MCS parameter configurations may include a modulation order and a coding rate. For example, the modulation order and the coding rate of the first MCS parameter configuration are quadrature phase-shift keying (QPSK) and 1/2, respectively. The modulation order and the coding rate of the second MCS parameter configuration are QPSK and 3/4, respectively. The modulation order and the coding rate of the third MCS parameter configuration are 16 quadrature amplitude modulation (QAM) and 3/4, respectively. The modulation order and the coding rate of the fourth MCS parameter configuration are 64-QAM and 2/3, respectively. In addition, the subset of MCS parameter configurations may be determined according to at least one random procedure or a prediction of future scheduling decisions, but is not limited herein.

The network may transmit information of the subset of MCS parameter configurations to the communication device via a high layer signaling (e.g., RRC signaling), after the subset of MCS parameter configurations is determined by the network. Then, the network may perform a resource scheduling for the communication device and/or another communication device to select a resource. The network may further select a MCS parameter configuration (e.g., the second MCS parameter configuration in the table 502) from the four MCS parameter configurations. Next, the network may transmit information of the selected MCS parameter configuration to the communication device via a physical layer signaling (e.g., PDCCH signaling) with 2 bits "01". In addition, the selected MCS parameter configuration corresponds to the other communication device.

Further, the network may transmit a signal to the communication device via the resource according to the transmission scheme and its MCS parameter configuration (e.g., the fourth MCS parameter configuration in the table 502). The network may transmit another signal to the other communication device via the resource according to the transmission scheme and the selected MCS parameter configuration.

According to the above description, the communication device may obtain a processed signal by performing a signal processing operation according to the selected MCS parameter configuration and the transmission scheme. The signal processing operation may focus on processing the interference cancellation. Then, the communication device may detect (e.g., demodulate and/or decode) the processed signal according to its MCS parameter configuration and the transmission scheme.

Figure 6:
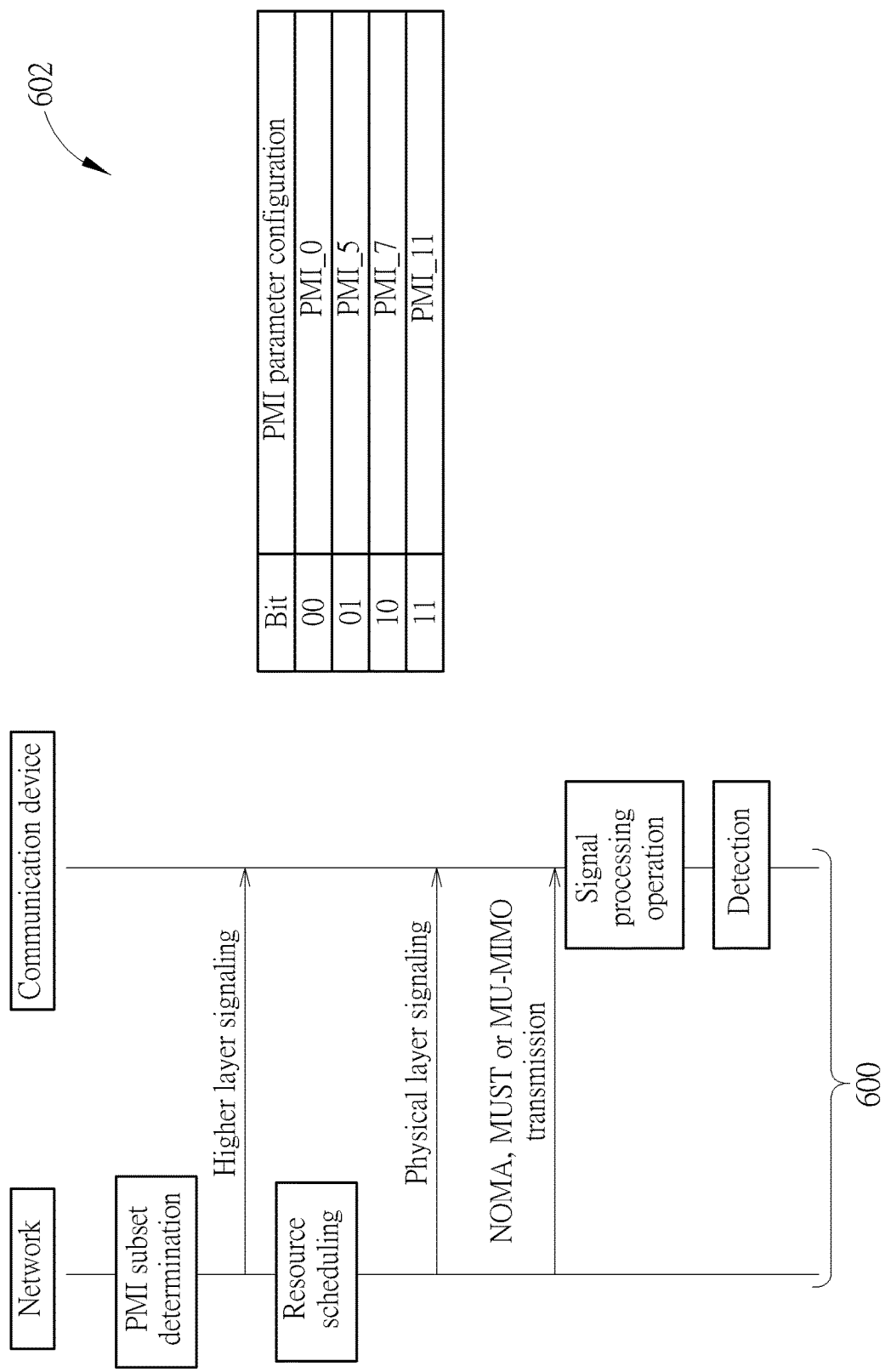
FIG. 6 is a schematic diagram of the selection of PMI parameter configuration according to an example of the present invention.

FIG. 6 is a schematic diagram of the selection of PMI parameter configuration according to an example of the present invention. The interactions between the network (e.g., network in FIG. 1) and the communication device (e.g., communication device in FIG. 1) according to PMI parameter configurations and a transmission scheme (e.g., NOMA scheme, MUST scheme or MU-MIMO scheme) are shown in a region 600. A subset of PMI parameter configurations (e.g., subset of parameter configurations in the processes 30 and/or 40) is shown in a table 602. Information of each of the PMI parameter configurations may be represented by 2 bits.

In the region 600, a subset of PMI parameter configurations may be first determined by the network. For example, the subset of PMI parameter configurations may include four PMI parameter configurations (e.g., PMI_0, PMI_5, PMI_7 and PMI_11) as shown in the table 602. In addition, the subset of PMI parameter configurations may be determined according to at least one random procedure or a prediction of future scheduling decisions, but is not limited herein.

The network may transmit information of the subset of PMI parameter configurations to the communication device via a high layer signaling (e.g., RRC signaling), after the subset of PMI parameter configurations is determined by the network. Then, the network may perform a resource scheduling for the communication device and/or another communication device to select a resource. The network may further select a PMI parameter configuration (e.g., PMI_7 in the table 602) from the four PMI parameter configurations. Next, the network may transmit information of the selected PMI parameter configuration to the communication device via a physical layer signaling (e.g., PDCCH signaling) with 2 bits "10". In addition, the selected PMI parameter configuration corresponds to the other communication device.

Further, the network may transmit a signal to the communication device via the resource according to the transmission scheme and its PMI parameter configuration (e.g., PMI_5 in the table 602). The network may transmit another signal to the other communication device via the resource according to the transmission scheme and the selected PMI parameter configuration.

According to the above description, the communication device may obtain a processed signal by performing a signal processing operation according to the selected PMI parameter configuration and the transmission scheme. The signal processing operation may focus on processing the interference cancellation. Then, the communication device may detect (e.g., demodulate and/or decode) the processed signal according to its PMI parameter configuration and the transmission scheme.

Figure 7:
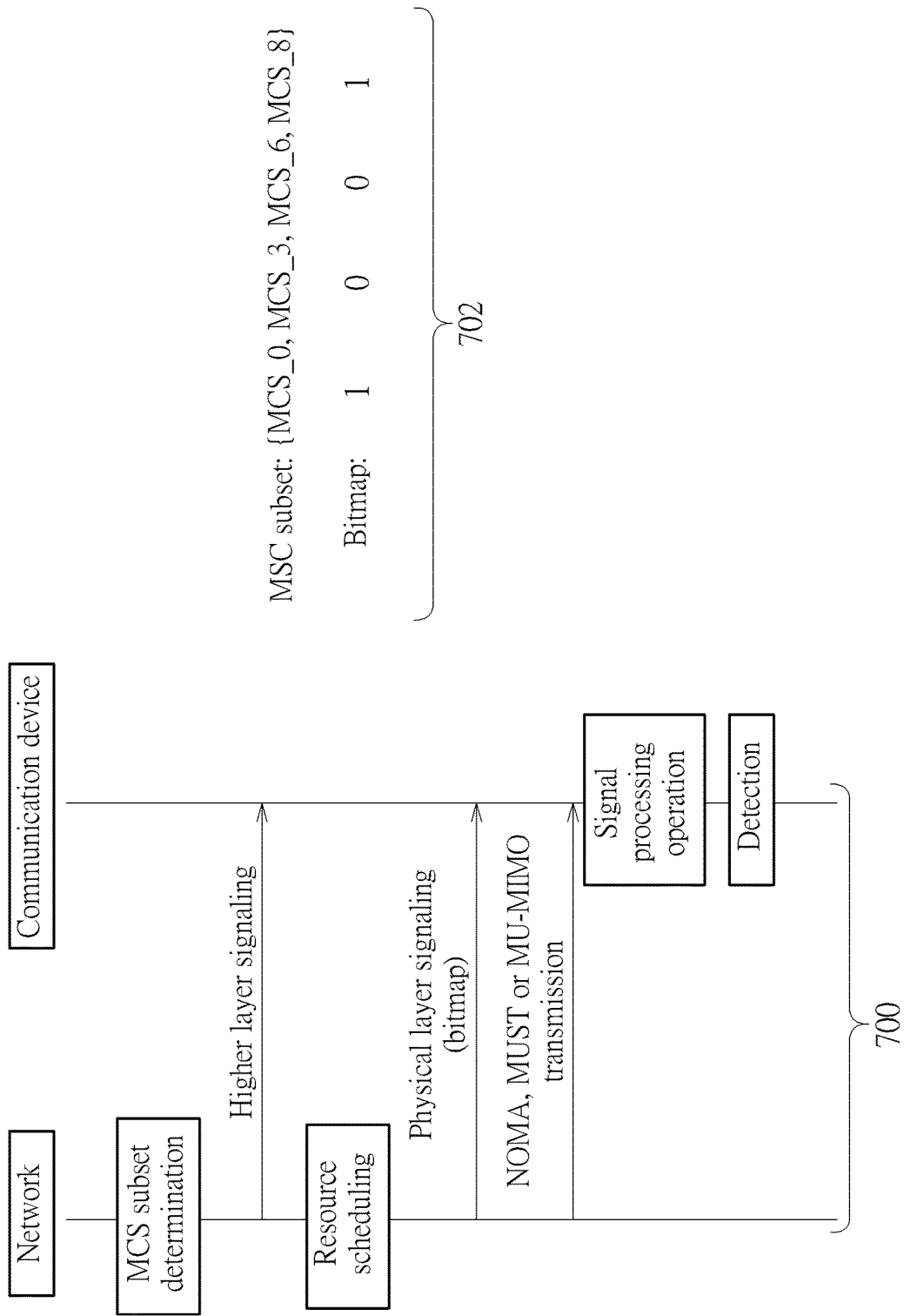
FIG. 7 is a schematic diagram of the selection of at least one MCS parameter configuration according to an example of the present invention.

FIG. 7 is a schematic diagram of the selection of at least one MCS parameter configuration according to an example of the present invention. The interactions between the network (e.g., network in FIG. 1) and the communication device (e.g., communication device in FIG. 1) according to MCS parameter configurations and a transmission scheme (e.g., NOMA scheme, MUST scheme or MU-MIMO scheme) are shown in a region 700. A subset of MCS parameter configurations (e.g., subset of parameter configurations in the processes 30 and/or 40) is shown in a region 702. Information of the at least one parameter configuration may be represented by a bitmap.

In the region 700, a subset of MCS parameter configurations may be first determined by the network. For example, the subset of MCS parameter configurations may include four MCS parameter configurations (e.g., MCS_0, MCS_3, MCS_6, and MCS_8) as shown in the region 702. Each of the four MCS parameter configurations may include a modulation order and a coding rate. In addition, the subset of MCS parameter configurations may be determined according to at least one random procedure or a prediction of future scheduling decisions, but is not limited herein.

The network may transmit information of the subset of MCS parameter configurations to the communication device via a high layer signaling (e.g., RRC signaling), after the subset of MCS parameter configurations is determined by the network. Then, the network may perform a resource scheduling for the communication device and/or another two communication devices to select a resource. The network may further select two MCS parameter configurations (e.g., MCS_0 and MCS_8 in the region 702) from the four MCS parameter configurations. Next, the network may transmit information of the selected MCS parameter configurations to the communication device via a physical layer signaling (e.g., PDCCH signaling) with a bitmap "1001". That is, the first MCS parameter configuration (e.g., MCS_0 in the region 702) and the fourth MCS parameter configuration (e.g., MCS_8 in the region 702) are selected by the network. Further, a length of the bitmap is determined according to a size of the subset of MCS parameter configurations. In the example, the length of the bitmap is determined as 4 bits because the size of the subset of MCS parameter configurations is 4. In addition, the selected MCS parameter configurations correspond to the other two communication devices.

Further, the network may transmit a signal to the communication device via the resource according to the transmission scheme and its MCS parameter configuration (e.g., MCS_3 in the region 702). The network may transmit two signals to the other two communication devices via the resource according to the transmission scheme and the selected MCS parameter configurations.

According to the above description, the communication device may obtain a processed signal by performing a signal processing operation according to the selected MCS parameter configurations and the transmission scheme. The signal processing operation may focus on processing the interference cancellation. Then, the communication device may detect (e.g., demodulate and/or decode) the processed signal according to its MCS parameter configuration and the transmission scheme.

Figure 8:
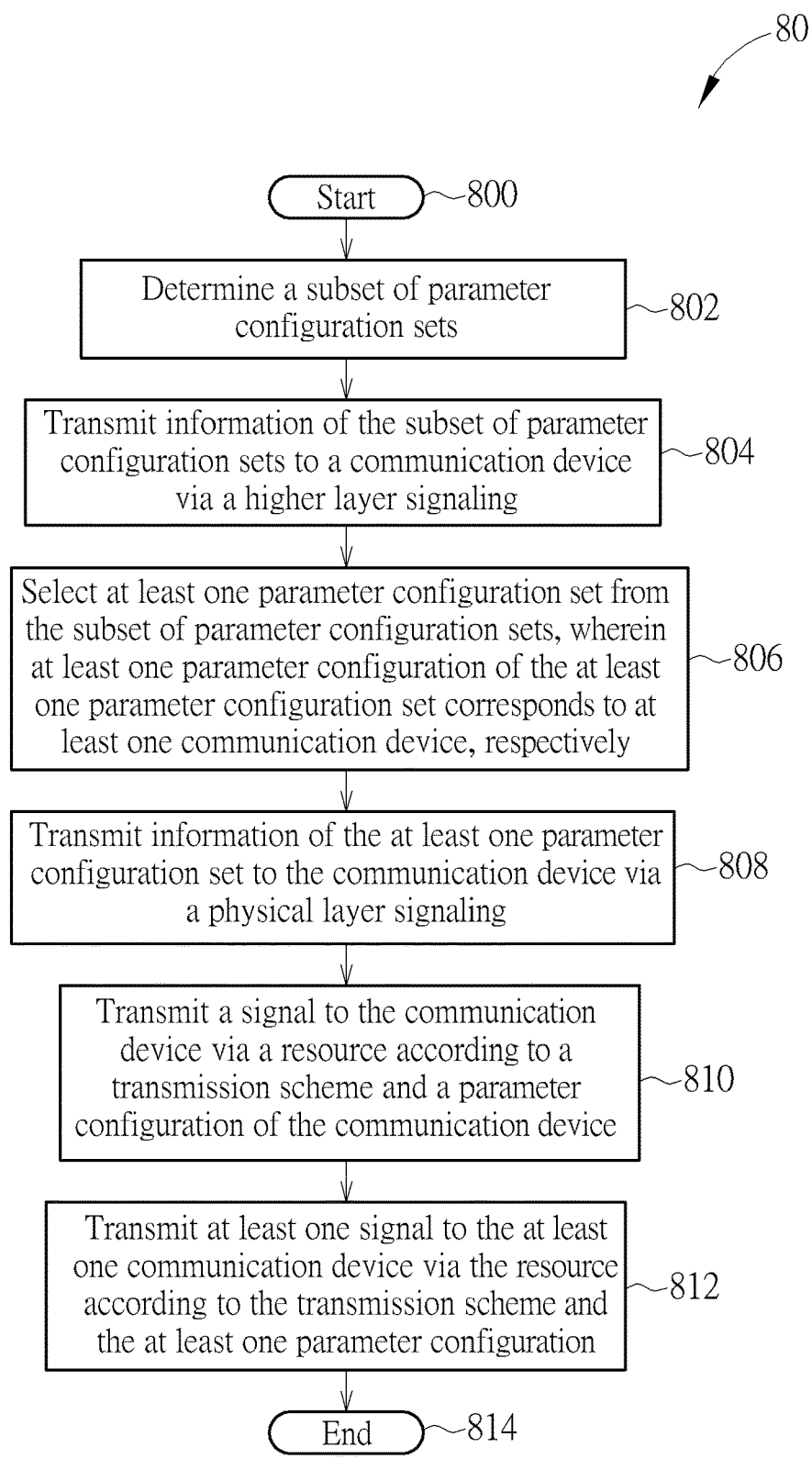
FIG. 8 is a flowchart of a process according to an example of the present invention.
Figure 9:
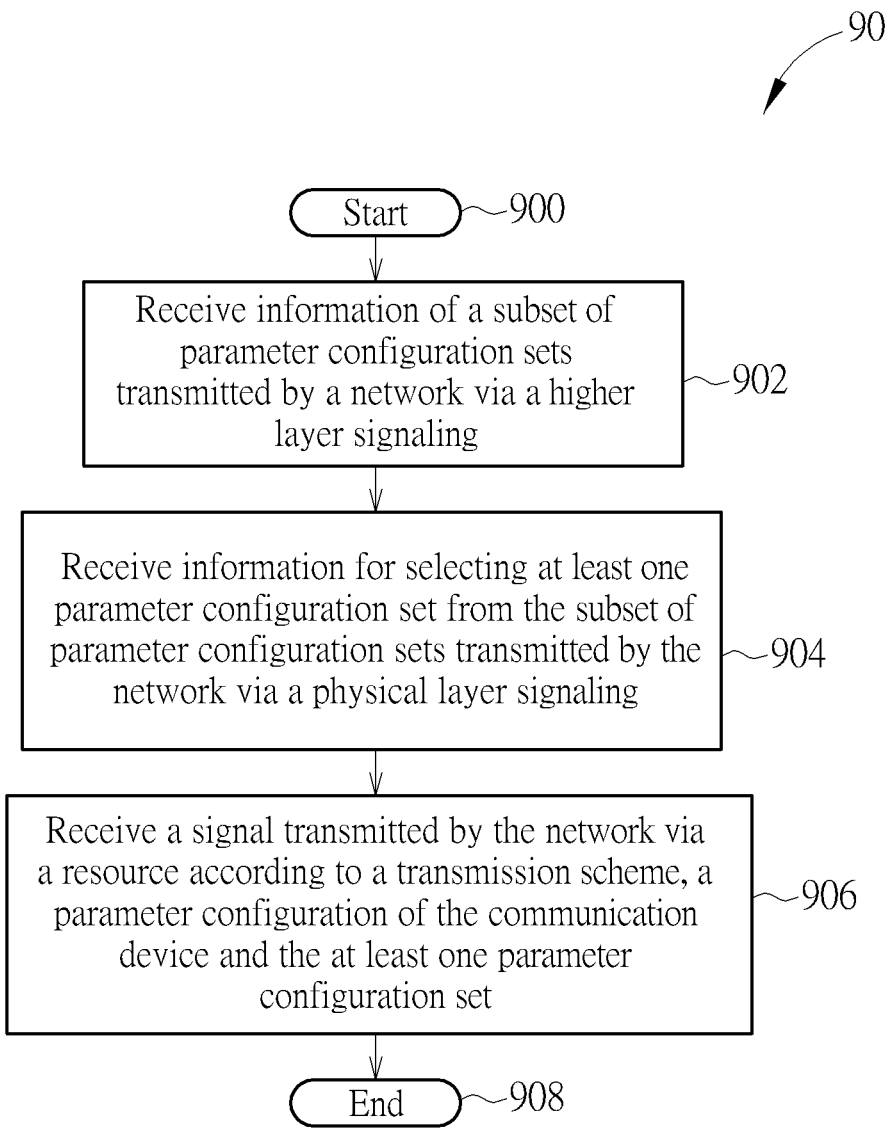
FIG. 9 is a flowchart of a process according to an example of the present invention.

FIG. 8 is a flowchart of a process 80 according to an example of the present invention. The process 80 may be utilized in a network (e.g., network in FIG. 1) to handle parameter configurations. The process 80 may be compiled into the program code 214 and includes the following steps:

Step 800: Start.

Step 802: Determine a subset of parameter configuration sets.

Step 804: Transmit information of the subset of parameter configuration sets to a communication device via a higher layer signaling.

Step 806: Select at least one parameter configuration set from the subset of parameter configuration sets, wherein at least one parameter configuration of the at least one parameter configuration set corresponds to at least one communication device, respectively.

Step 808: Transmit information of the at least one parameter configuration set to the communication device via a physical layer signaling.

Step 810: Transmit a signal to the communication device via a resource according to a transmission scheme and a parameter configuration of the communication device.

Step 812: Transmit at least one signal to the at least one communication device via the resource according to the transmission scheme and the at least one parameter configuration.

Step 814: End.

According to the process 80, the network may determine a subset of parameter configuration sets and may transmit information of the subset of parameter configuration sets to a communication device via a higher layer signaling (e.g., RRC signaling). Next, the network may select at least one parameter configuration set from the subset of parameter configuration sets, wherein at least one parameter configuration of the at least one parameter configuration set corresponds to at least one communication device, respectively. The network may transmit information of the at least one parameter configuration set to the communication device via a physical layer signaling (e.g., PDCCH signaling). The network may transmit a signal to the communication device via a resource according to a transmission scheme and a parameter configuration of the communication device. The network may transmit at least one signal to the at least one communication device via the resource according to the transmission scheme and the at least one parameter configuration. That is, the information of the subset of parameter configuration sets is transmitted less frequently to reduce overhead. The overhead for selecting (and notifying) the at least one parameter configuration set for the other communication device(s) is further reduced, because the selection is performed within the subset (e.g., reduced set) of parameter configuration sets by using the physical layer signaling which is transmitted more frequently. Thus, overhead for notifying the parameter configurations to the communication device can be reduced. Please note that, the resource may be determined according to a resource scheduling of the network. That is, the resource may not be determined by the transmission scheme.

Operations of a communication device in the above examples can be summarized into a process 90 to handle parameter configurations, and can be compiled into the program code 214. The process 90 includes the following steps:

Step 900: Start.

Step 902: Receive information of a subset of parameter configuration sets transmitted by a network via a higher layer signaling.

Step 904: Receive information for selecting at least one parameter configuration set from the subset of parameter configuration sets transmitted by the network via a physical layer signaling.

Step 906: Receive a signal transmitted by the network via a resource according to a transmission scheme, a parameter configuration of the communication device and the at least one parameter configuration set.

Step 908: End.

According to the process 90, the communication device may receive information of a subset of parameter configuration sets transmitted by a network via a higher layer signaling (e.g., RRC signaling). Next, the communication device may receive information for selecting at least one parameter configuration set from the subset of parameter configuration sets transmitted by the network via a physical layer signaling (e.g., PDCCH signaling). The communication device may receive a signal transmitted by the network via a resource according to a transmission scheme, a parameter configuration of the communication device and the at least one parameter configuration set. That is, the information of the subset of parameter configuration sets is received less frequently to reduce overhead. The overhead for selecting (and receiving) the at least one parameter configuration set is further reduced, because the selection is performed within the subset (e.g., reduced set) of parameter configuration sets by using the physical layer signaling which is transmitted more frequently. Thus, overhead for receiving the information of the parameter configurations from the network can be reduced. Please note that, the resource may be determined according to a resource scheduling of the network. That is, the resource may not be determined by the transmission scheme.

Realization of the present invention is not limited to the above description. The following examples may be applied to the process 80 and/or 90.

In one example, the each parameter configuration of the subset of parameter configuration sets in the processes 80 and/or 90 may include a MCS and/or a PMI. In one example, the transmission scheme may include a NOMA scheme, a MUST scheme or a MU-MIMO scheme. That is, the transmission/reception may be performed according to the NOMA scheme, the MUST scheme or the MU-MIMO scheme. The information of the at least one parameter configuration set may be represented by at least one bit or a bitmap. Further, a length of the bitmap may be determined according to a size of the subset of parameter configuration sets. In one example, the resource may include a time resource and/or a frequency resource.

In one example, the communication device in the process 90 may perform a blind detection (e.g., blind decoding) on the at least one parameter configuration set, to select one parameter configuration from the at least one parameter configuration, after the communication device receives the signal transmitted by the network via the resource. In one example, the communication device may further perform a signal processing operation (e.g., interference cancellation, maximum-likelihood (ML) detection, reduced-complexity ML detection or sphere decoding) on the signal according to the transmission scheme and the at least one parameter configuration, to obtain a processed signal. The ML detection, the reduced-complexity ML detection and the sphere decoding may focus on processing the interference cancellation. Next, the communication device may detect (e.g., demodulate and/or decode) the processed signal according to the transmission scheme and the parameter configuration of the communication device. In addition, the interference cancellation may include a successive interference cancellation, a symbol-level interference cancellation, or a codeword-level interference cancellation. Further, the at least one parameter configuration of the at least one parameter configuration set corresponds to at least one communication device, respectively. That is, the network may transmit the at least one signal to the at least one communication device according to the at least one parameter configuration, respectively. The at least one communication device may receive at least one signal transmitted by the network via the resource according to the transmission scheme and the at least one parameter configuration. That is, the network may communicate with the communication device and the at least one communication device via the same resource.

Figure 10:
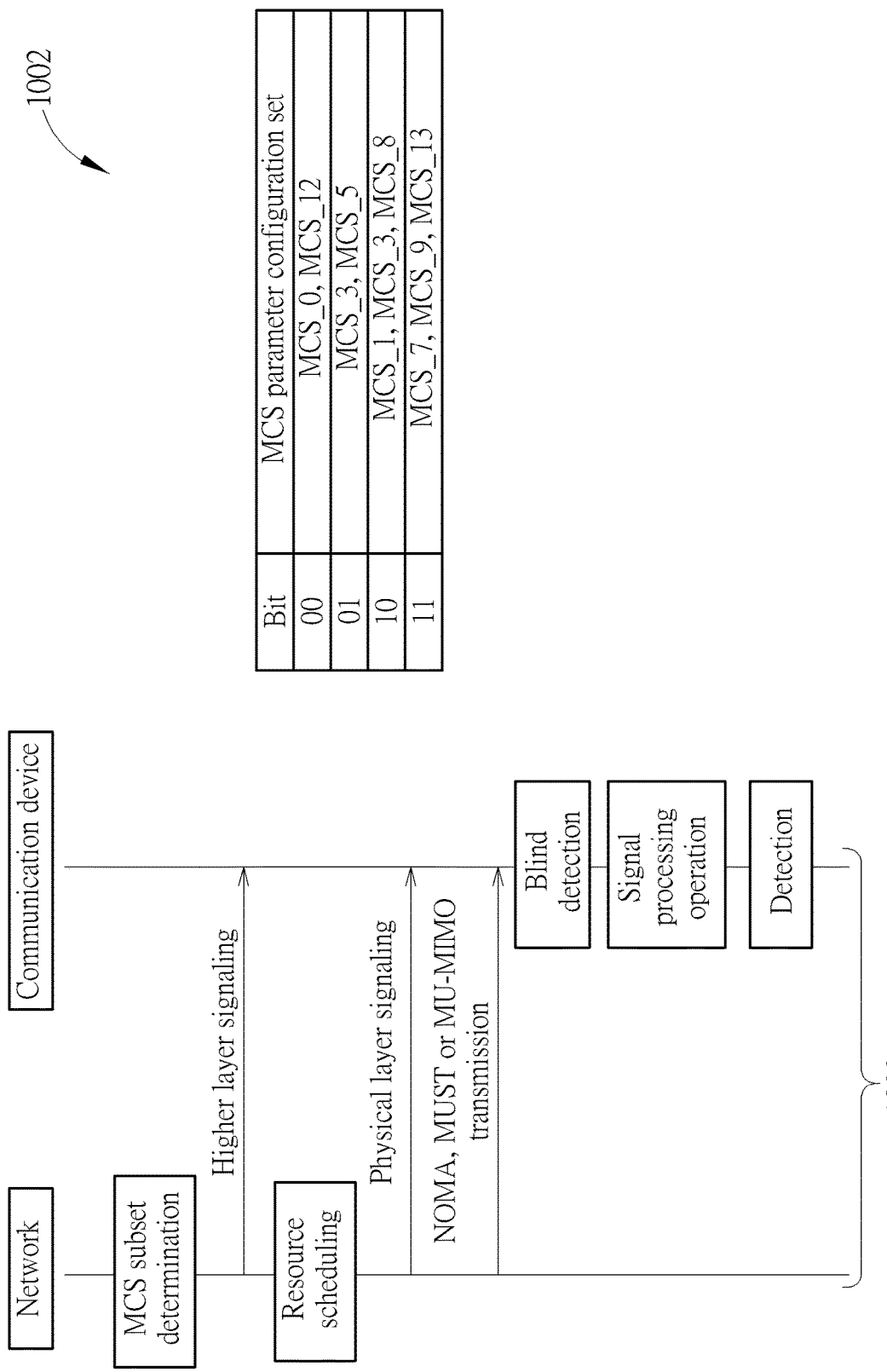
FIG. 10 is a schematic diagram of the selection of at least one MCS parameter configuration set according to an example of the present invention.

FIG. 10 is a schematic diagram of the selection of at least one MCS parameter configuration set according to an example of the present invention. The interactions between the network (e.g., network in FIG. 1) and the communication device (e.g., communication device in FIG. 1) according to MCS parameter configuration sets and a transmission scheme (e.g., NOMA scheme, MUST scheme or MU-MIMO scheme) are shown in a region 1000. A subset of MCS parameter configuration sets (e.g., subset of parameter configuration sets in the processes 80 and/or 90) is shown in a table 1002. Information of each of MCS parameter configuration sets may be represented by 2 bits.

In the region 1000, a subset of MCS parameter configuration sets may be first determined by the network. For example, the subset of MCS parameter configuration sets may include four MCS parameter configuration sets (e.g., {MCS_0, MCS_12}, {MCS_3, MCS_5}, {MCS_1, MCS_3, MCS_8}, and {MCS_7, MCS_9, MCS_13}) as shown in the table 1002. Each MCS parameter configuration of the four MCS parameter configuration sets may include a modulation order and a coding rate. In addition, the subset of MCS parameter configuration sets may be determined according to at least one random procedure or a prediction of future scheduling decisions, but is not limited herein.

The network may transmit information of the subset of MCS parameter configuration sets to the communication device via a high layer signaling (e.g., RRC signaling), after the subset of MCS parameter configuration sets is determined by the network. Then, the network may perform a resource scheduling for the communication device and/or another communication device to select a resource. The network may further select a MCS parameter configuration set (e.g., {MCS_1, MCS_3, MCS_8} in the table 1002) from the four MCS parameter configuration sets. Next, the network may transmit information of the selected MCS parameter configuration set to the communication device via a physical layer signaling (e.g., PDCCH signaling) with 2 bits "10". In addition, a MCS parameter configuration (e.g., MCS_3) of the selected MCS parameter configuration set corresponds to the other communication device.

Further, the network may transmit a signal to the communication device via the resource according to the transmission scheme and its MCS parameter configuration (e.g., MCS_0 in the table 1002). The network may transmit another signal to the other communication device via the resource according to the transmission scheme and a MCS parameter configuration in the selected MCS parameter configuration set.

According to the above description, the communication device may perform a blind detection (e.g., blind decoding) on the selected MCS parameter configuration set, to select a MCS parameter configuration (e.g., MCS_3). That is, complexity for obtaining the selected MCS parameter configuration is reduced, because the search space is reduced to 3 MCS parameter configurations. In addition, flexibility of the selection of the MCS parameter configuration is improved due to usage of the MCS parameter configuration set. Then, the communication device may obtain a processed signal by performing a signal processing operation according to the selected MCS parameter configuration and the transmission scheme. The signal processing operation may focus on processing the interference cancellation. Then, the communication device may detect (e.g., demodulate and/or decode) the processed signal according to its MCS parameter configuration and the transmission scheme.

It should be noted that the above example illustrates a case where one MCS parameter configuration set is transmitted by the network. Consider also the example of FIG. 7 where multiple co-scheduled communication devices exist, the network may transmit information of multiple MCS parameter configuration sets (e.g., the third MCS parameter configuration set and the fourth MCS parameter configuration set) to the communication device. Accordingly, the communication device may perform the blind detection on the MCS parameter configuration sets, to select MCS parameter configurations (e.g., MCS_1 and MCS_7) from the MCS parameter configuration sets, respectively.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium.

The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and method of handling parameter configurations. The information of parameter configurations is transmitted/received less frequently to reduce overhead. The overhead for selecting (and notifying/receiving) at least one parameter configuration for at least one communication device is further reduced, because the selection is performed within a subset (e.g., reduced set) of parameter configurations (or parameter configuration sets). Thus, overhead for notifying/receiving the parameter configurations (or the parameter configuration sets) can be reduced. In addition, complexity for obtaining the selected parameter configuration is reduced when a parameter configuration set is received, because a size of the search space is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network for handling parameter configurations, comprising:
a storage device; and
a processing circuit, coupled to the storage device, wherein the storage device stores, and the processing circuit is configured to execute instructions of:
determining a subset of parameter configurations;
transmitting information of the subset of parameter configurations to a communication device via a higher layer signaling;
selecting at least one parameter configuration from the subset of parameter configurations, wherein the at least one parameter configuration corresponds to at least one communication device, respectively;
transmitting information of the at least one parameter configuration to the communication device via a physical layer signaling;
transmitting a signal to the communication device via a resource according to a transmission scheme and a parameter configuration of the communication device; and
transmitting at least one signal to the at least one communication device via the resource according to the transmission scheme and the at least one parameter configuration;
wherein the transmission scheme and the at least one parameter configuration are for the communication device to perform an interference cancellation on the signal;
wherein the transmission scheme comprises a non-orthogonal multiple access (NOMA) scheme.

2. The network of claim 1, wherein each of the subset of parameter configurations comprises a modulation and coding scheme (MCS) and/or a precoding matrix index (PMI).

3. The network of claim 1, wherein the transmission scheme comprises a multi-user superposition transmission (MUST) scheme or a multi-user multi-input multi-output (MU-MIMO) scheme.

4. The network of claim 1, wherein the information of the at least one parameter configuration is represented by at least one bit or a bitmap.

5. The network of claim 4, wherein a length of the bitmap is determined according to a size of the subset of parameter configurations.

6. The network of claim 1, wherein the resource comprises a time resource and/or a frequency resource.

7. A communication device for handling parameter configurations, comprising:
a storage device; and
a processing circuit, coupled to the storage device, wherein the storage device stores, and the processing circuit is configured to execute instructions of:
receiving information of a subset of parameter configurations transmitted by a network via a higher layer signaling;
receiving information for selecting at least one parameter configuration from the subset of parameter configurations transmitted by the network via a physical layer signaling;
receiving a signal transmitted by the network via a resource according to a transmission scheme, a parameter configuration of the communication device and the at least one parameter configuration; and
perform an interference cancellation on the signal according to the transmission scheme and the at least one parameter configuration;
wherein the transmission scheme comprises a non-orthogonal multiple access (NOMA) scheme.

8. The communication device of claim 7, wherein each of the subset of parameter configurations comprises a modulation and coding scheme (MCS) and/or a precoding matrix index (PMI).

9. The communication device of claim 7, wherein the transmission scheme comprises a multi-user superposition transmission (MUST) scheme or a multi-user multi-input multi-output (MU-MIMO) scheme.

10. The communication device of claim 7, wherein the information of the at least one parameter configuration is represented by at least one bit or a bitmap.

11. The communication device of claim 10, wherein a length of the bitmap is determined according to a size of the subset of parameter configurations.

12. The communication device of claim 7, wherein the resource comprises a time resource and/or a frequency resource.

13. The communication device of claim 7, wherein the instruction of receiving the signal transmitted by the network via the resource according to the transmission scheme, the parameter configuration of the communication device and the at least one parameter configuration comprises:
receiving the signal transmitted by the network via the resource;

performing a signal processing operation on the signal according to the transmission scheme and the at least one parameter configuration, to obtain a processed signal; and detecting the processed signal according to the transmission scheme and the parameter configuration of the communication device.

14. The communication device of claim 13, wherein the signal processing operation comprises a successive interference cancellation (SIC), a symbol-level interference cancellation, a codeword-level interference cancellation, a maximum-likelihood detection, a reduced-complexity maximum-likelihood detection, or a sphere coding.

15. The communication device of claim 13, wherein the at least one parameter configuration corresponds to at least one communication device, respectively.

16. The communication device of claim 15, wherein the at least one communication device receives at least one signal transmitted by the network via the resource according to the transmission scheme and the at least one parameter configuration.

17. A network for handling parameter configurations, comprising:
a storage device; and
a processing circuit, coupled to the storage device, wherein the storage device stores, and the processing circuit is configured to execute instructions of:
determining a subset of parameter configuration sets;
transmitting information of the subset of parameter configuration sets to a communication device via a higher layer signaling;
selecting at least one parameter configuration set from the subset of parameter configuration sets, wherein at least one parameter configuration of the at least one parameter configuration set corresponds to at least one communication device, respectively;
transmitting information of the at least one parameter configuration set to the communication device via a physical layer signaling;
transmitting a signal to the communication device via a resource according to a transmission scheme and a parameter configuration of the communication device; and
transmitting at least one signal to the at least one communication device via the resource according to the transmission scheme and the at least one parameter configuration;
wherein the transmission scheme and the at least one parameter configuration set are for the communication device to perform an interference cancellation on the signal;
wherein the transmission scheme comprises a non-orthogonal multiple access (NOMA) scheme.

18. The network of claim 17, wherein each parameter configuration of the subset of parameter configuration sets comprises a modulation and coding scheme (MCS) and/or a precoding matrix index (PMI).

19. The network of claim 17, wherein the transmission scheme comprises a multi-user superposition transmission (MUST) scheme or a multi-user multi-input multi-output (MU-MIMO) scheme.

20. The network of claim 17, wherein the information of the at least one parameter configuration set is represented by at least one bit or a bitmap.

21. The network of claim 20, wherein a length of the bitmap is determined according to a size of the subset of parameter configuration sets.

22. The network of claim 17, wherein the resource comprises a time resource and/or a frequency resource.

23. A communication device for handling parameter configurations, comprising:
a storage device; and
a processing circuit, coupled to the storage device, wherein the storage device stores, and the processing circuit is configured to execute instructions of:
receiving information of a subset of parameter configuration sets transmitted by a network via a higher layer signaling;
receiving information for selecting at least one parameter configuration set from the subset of parameter configuration sets transmitted by the network via a physical layer signaling;
receiving a signal transmitted by the network via a resource according to a transmission scheme, a parameter configuration of the communication device and the at least one parameter configuration set; and
perform an interference cancellation on the signal according to the transmission scheme and the at least one parameter configuration set;
wherein the transmission scheme comprises a non-orthogonal multiple access (NOMA) scheme.

24. The communication device of claim 23, wherein each parameter configuration of the subset of parameter configuration sets comprises a modulation and coding scheme (MCS) and/or a precoding matrix index (PMI).

25. The communication device of claim 23, wherein the transmission scheme comprises, a multi-user superposition transmission (MUST) scheme or a multi-user multi-input multi-output (MU-MIMO) scheme.

26. The communication device of claim 23, wherein the information of the at least one parameter configuration set is represented by at least one bit or a bitmap.

27. The communication device of claim 26, wherein a length of the bitmap is determined according to a size of the subset of parameter configuration sets.

28. The communication device of claim 23, wherein the resource comprises a time resource and/or a frequency resource.

29. The communication device of claim 23, wherein the instruction of receiving the signal transmitted by the network via the resource according to the transmission scheme, the parameter configuration of the communication device and the at least one parameter configuration set comprises:
receiving the signal transmitted by the network via the resource;
performing a blind detection on the at least one parameter configuration set, to select at least one parameter configuration from the at least one parameter configuration set;
performing a signal processing operation on the signal according to the transmission scheme and the at least one parameter configuration, to obtain a processed signal; and
detecting the processed signal according to the transmission scheme and the parameter configuration of the communication device.

30. The communication device of claim 29, wherein the signal processing operation comprises a successive interference cancellation (SIC), a symbol-level interference cancellation, a codeword-level interference cancellation, a maximum-likelihood detection, a reduced-complexity maximum-likelihood detection, or a sphere coding.

31. The communication device of claim 29, wherein the at least one parameter configuration of the at least one parameter configuration set corresponds to at least one communication device, respectively.

32. The communication device of claim 31, wherein the at least one communication device receives at least one signal transmitted by the network via the resource according to the transmission scheme and the at least one parameter configuration.

* * * * *